Figure 6:
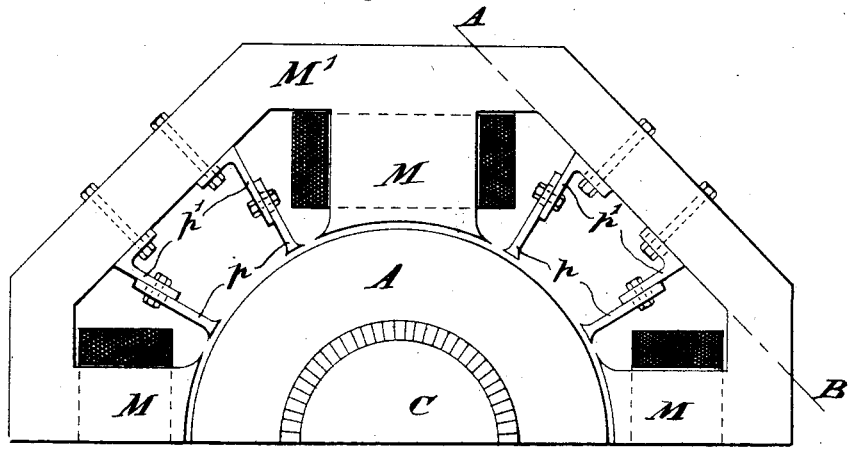

No. 607,593. Patented July 19, 1898.
W. B. SAYERS.
DYNAMO ELECTRIC MACHINE.
(Application filed Dec. 21, 1897.)
(No Model.) 4 Sheets—Sheet 1.
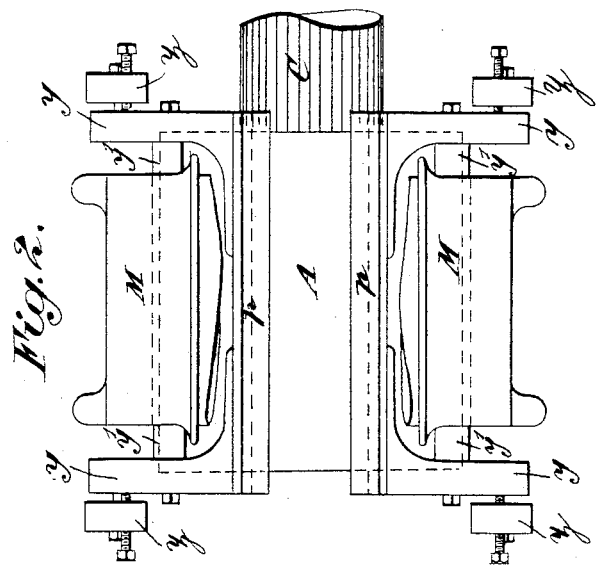
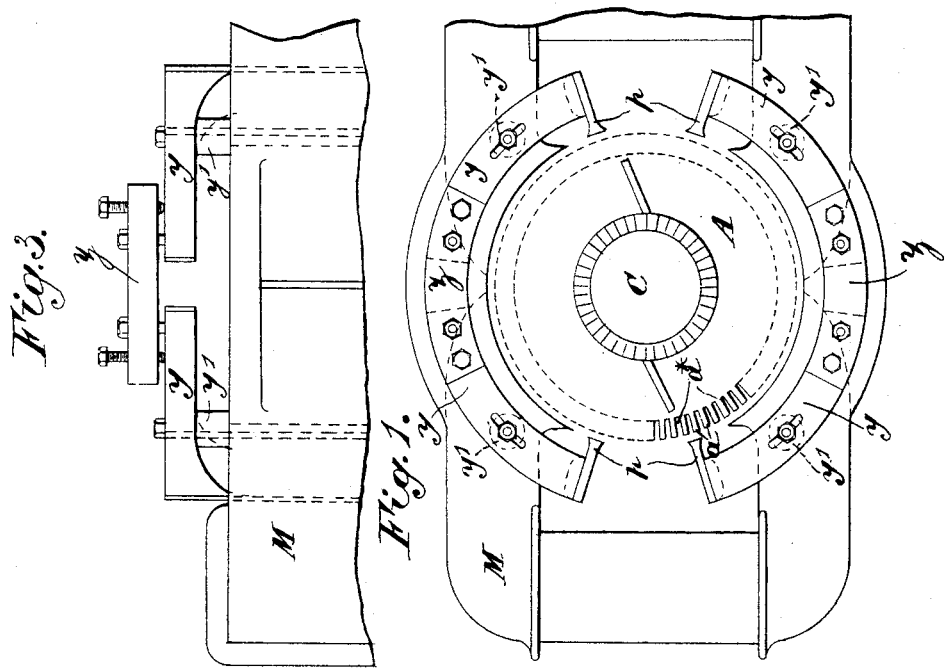
Witnesses:
Wm H Capel
C L Belcher
Inventor
William B. Sayers,
By
Attorney
THE NORRIS PETERS CO., PHOTO-LITHO., WASHINGTON, D. C.

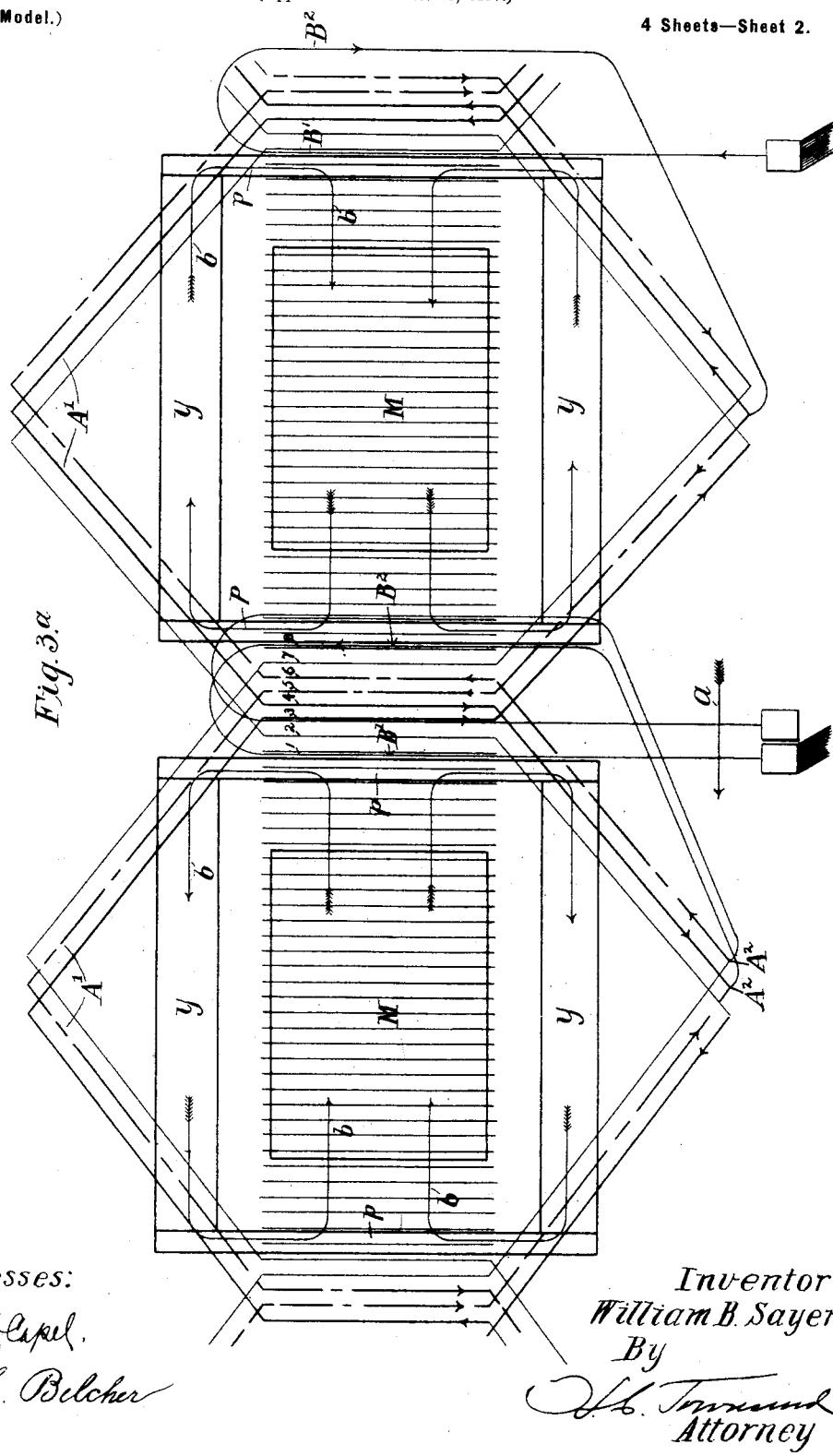

No. 607,593. Patented July 19, 1898.
W. B. SAYERS.
DYNAMO ELECTRIC MACHINE.
(Application filed Dec. 21, 1897.)
(No Model.) 4 Sheets—Sheet 3.
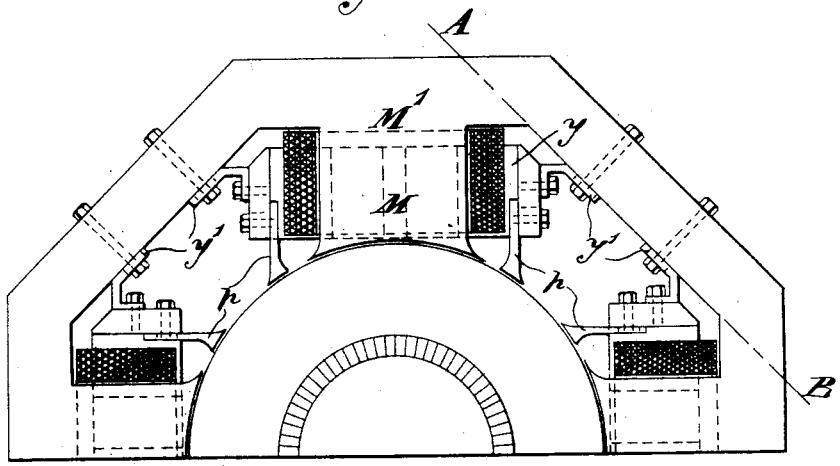
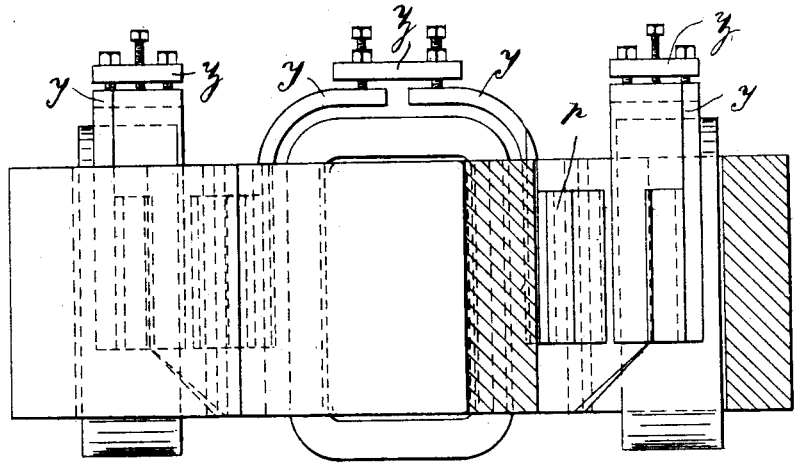
Witnesses:
H. N. Capel.
C. L. Belcher.
Inventor
William B. Sayers
By
Attorney.

No. 607,593. Patented July 19, 1898.
W. B. SAYERS.
DYNAMO ELECTRIC MACHINE.
(Application filed Dec. 21, 1897.)
(No Model.) 4 Sheets—Sheet 4.

Witnesses:
Inventor
William B. Sayers
By
Attorney

UNITED STATES PATENT OFFICE.

WILLIAM BROOKS SAYERS, OF GLASGOW, SCOTLAND, ASSIGNOR TO HIMSELF AND MAVOR & COULSON, LIMITED, OF SAME PLACE.

DYNAMO-ELECTRIC MACHINE.

SPECIFICATION forming part of Letters Patent No. 607,593, dated July 19, 1898.

Application filed December 21, 1897. Serial No. 662,885. (No model.) Patented in England November 30, 1896, No. 27,209.

*To all whom it may concern:*

Be it known that I, WILLIAM BROOKS SAYERS, a subject of the Queen of Great Britain and Ireland, residing at Glasgow, in the county of Dumbarton, Scotland, have invented Improvements in Dynamo-Electric Machines, (for which I have obtained a patent in England, No. 27,209, dated November 30, 1896,) of which the following is a specification.

This invention of improvements in dynamo-electric machines has reference more particularly to machines of the kind constructed according to the specifications of former Letters Patents, No. 516,553, dated March 13, 1894, and No. 524,119, dated August 7, 1894, granted to me; and it has for its object to secure fixity of position of the brushes with varying load in whichever direction the machine be run and whether as a generator or as a motor. In a machine for this purpose, according to this invention, frames of iron, each of sufficient cross-section to carry the requisite induction, are fixed around or at opposite sides of the armature, so as to be kept clear of the field magnet or magnets as far as practicable, the necessary support being provided by brackets or other suitable devices of non-magnetic material, such as brass or gun-metal. Each frame is preferably kept in the region of one pole only of the field magnet or magnets, so as to minimize magnetic leakage. Two opposite sides of each frame have formed upon them polar projections which are arranged longitudinally with relation to the cylindrical surface of the armature, but are separated therefrom by a suitable distance. The arrangement is such that when a current is flowing in the armature there will be generated through the circuit formed by the armature-core and the frames a magnetic flux which will be proportional to the armature-current throughout a considerable range. The frames, with their polar projections, are so relatively adjusted that the distance between the two polar projections belonging to opposite frames and measured over the surface of the armature or tangential thereto is approximately equal to or rather greater than the distance between two sides of a commutator-coil, such as described in one of the said former specifications—viz., No. 524,119. By this means the magnetic flux generated will be in the proper direction to bring about the reversal of the current in the armature-sections at the required times in whichever direction the machine may be running and whether as a generator or as a motor.

Figure 7:
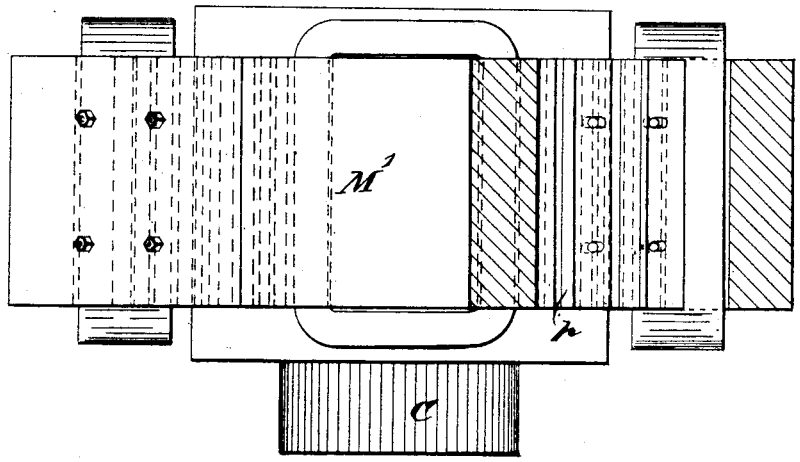

Figures 1, 2, and 3 of the accompanying illustrative drawings show, respectively, in end, side, and plan view so much of a two-pole dynamo-electric machine of the kind referred to as is necessary to illustrate the application thereto of reversing means according to the present invention. Fig. $3^a$ is a diagram, to a larger scale than Figs. 1 to 3, inclusive, showing part of an armature-winding with commutator-coils arranged according to the said former specification, No. 524,119, and reversing means according to the present invention. Fig. 4 is a part sectional end elevation, and Fig. 5 a sectional plan on the line A B of Fig. 4, showing the application of the invention to a multipolar dynamo-electric machine of the kind referred to. Figs. 6 and 7 are similar views to Figs. 4 and 5, respectively, showing a modified construction of multipolar machine.

In each arrangement, A is an armature provided with a winding and commutator coils arranged according to the said former specification, No. 524,119, and C is the commutator, the strips of which are connected to the armature-winding through the said coils.

In the construction of two-pole machine shown in Figs. 1, 2, and 3 the field-magnet M is of approximately rectangular shape, as seen in end view, the exciting-coils being placed on its vertical portions, and the iron frames each consist of two nearly semicircular-shaped bars or yoke-pieces $y$, of iron, arranged parallel to each other, fixed to the ends of the field-magnet by brackets or blocks $y'$, of non-magnetic material, and bolts, and connected at their ends by flat iron bars $p$, which form the polar projections or reversing-poles above referred to, the polar projections on one frame facing those on the other and being separated from each other by a distance approximately equal or rather greater than the distance between the two sides $B'$ $B^2$ of each commutator-coil, Fig. $3^a$.

In the construction of four-pole machine shown in Figs. 4 and 5 each of the iron frames comprises a practically U-shaped yoke-piece $y$, secured by brackets $y'$, of non-magnetic material, to the yokes M' of the machine, so as to partly surround the corresponding pole M, and provided with flat iron bars $p$, that are arranged parallel to each other and to the axis of the armature and serve as the polar projections of the iron frames.

In each case the cross-section of the reversing pole-pieces $p$ and also of the yokes $y$, or the sum of the cross-sections of the pole-pieces and of the yokes, if the circuit is completed in more than one path, as is the case in the two-pole machine shown in Figs. 1, 2, and 3, should be approximately equal to or greater than the cross-section of the armature-teeth $a$, Fig. 1, upon which each reversing pole-piece $p$ is desired to act, the section being measured in each case in a direction at right angles to the magnetic flow. The number of armature-teeth $a^*$ upon which each reversing pole-piece $p$ should act, and to the aggregate section of which the cross-section of the said pole-piece should be approximately equal, is determined by the details of the winding. For example, if the number of sectors in the commutator is equal to the number of teeth on the armature, then the pole-pieces $p$ and their connecting-yokes $y$ should have a section equal to or greater than that of one tooth. If the number of sectors in the commutator is equal to half the number of teeth, then the pole-pieces $p$ and their connecting-yokes $y$ should each have a section equal to or greater than that of two armature-teeth, or if the number of sections in the commutator is equal to one-third the number of teeth in the armature then the poles and their connecting-yokes should have a section equal to or greater than that of three armature-teeth, and so on.

Fig. 3$^a$ shows the relative arrangement of the pole-pieces $p$ and the commutator-coils B' B$^2$. To avoid confusion, only those coils of the main winding A' and commutator-coils B' B$^2$ are shown which are in the region of commutation. The diagram represents a winding for a two-pole machine, some coils being repeated at opposite ends of the diagram. The section of the main winding which has just been reversed is shown by a somewhat thicker line than the others, while the one which will next be reversed is shown by a broken line, the direction of rotation being as shown by arrow $a$. The distance between the two pole-pieces $p$ that are nearest each other is approximately equal to the distance between the two side portions B' B$^2$ of the commutator-coil which respectively lie in slots 1 and 8 and are in connection with the armature-winding A' at a point A$^2$ thereof, located between the two main armature-sections, which lie in slots 4 and 6. The arrows $b$ indicate the path of the magnetic flux through each connected pair of pole-pieces $p$, yokes $y$, and the portion of the armature-core opposite them and forming part of the magnetic circuit. The pair of pole-pieces $p$ $p$ which are nearest together, but which are connected to different frames, act to bring about the reversal of the armature-section that is about to be commutated in the same way that the polar extensions E and field-magnet poles described in connection with Figs. 3, 3$^a$, 3$^b$, and 3$^c$ of the said former specification, No. 524,119, act to bring about the reversal of the armature-sections; but whereas in the arrangement described in the said former specification one or both of the pole pieces or tips of the field-magnets is or are magnetized by the field-winding, so that magnetization of such pole pieces or tips, and therefore their aggregate effect on the commutator-coils B' B$^2$, cannot be proportional to the armature-current, although their magnetization is strengthened thereby, in an arrangement according to the present invention both the poles $p$ $p$, acting on a commutator-coil B' B$^2$, are magnetized solely by the armature-current, so that the magnetic flux, acting to produce the reversal, is proportional to the armature-current throughout the range, in which the magnetic reluctance of the poles $p$ $p$, frames $y$, and the portion of the armature-core forming the magnetic circuit, as indicated by the arrows $b$ in Fig. 3$^a$, is a negligible quantity.

In Figs. 1, 2, and 3 each of the yokes $y$ is made in two parts adapted to be magnetically connected together by a block or piece $z$ of iron which is adapted to be adjusted nearer to or farther from the adjacent ends of the parts of the yoke and serves as a magnetic link by means of which the magnetic flux through the pole-pieces $p$ can be adjusted. If the blocks $z$ are screwed close up to the yokes $y$, then the magnetic flow will be at a maximum; but if they be moved to a greater or less distance from the yokes then the air-gap between the said parts interposes a magnetic reluctance. By thus varying the position of one or other, or both, of the magnetic blocks $z$ the magnetic flow can be adjusted to the required amount to secure sparkless commutation. Adjustment of the magnetic flow can also be made by causing the pole-pieces $p$ to approach or recede from the armature. When sparkless commutation has been produced by the means above described, the position of the brushes will be the same for all loads and for either direction of rotation of the machine. In Figs. 4 and 5 each frame or yoke $y$ is provided with a single adjustable block $z$ of iron for the same purpose as the two blocks for each frame shown in Figs. 1, 2, and 3.

Figs. 6 and 7 show a modified construction of multipolar machine in which the polar projections or reversing-poles $p$ $p$ are connected magnetically to the yoke M' of the field-magnet by pieces $p'$ of iron, to which the pole-pieces $p$ may be separately secured by bolts, as shown, so as to allow of adjustment to and from the armature A; but each pole-piece $p$ may be made in one piece with the corresponding yoke M'. This arrangement is more liable to be disturbed by variation in the permeability of the field-magnets, with varying degrees of magnetization, than are the arrangements shown in Figs. 1, 2, and 3 and in Figs. 4 and 5, but is sufficient in practice in many cases to enable the object of this invention to be attained.

What I claim is—

1. A dynamo-electric machine of the kind herein referred to provided on each of the two opposite sides as set forth of each pole of the field-magnet with a polar projection, the two such polar projections constituting a pair being arranged longitudinally in relation to the cylindrical surface of the armature, but separate therefrom and connected together magnetically so as to form with the armature-core a magnetic circuit in which there will be produced, when a current is flowing in the armature, a magnetic flux that will be proportional throughout a considerable range to the armature-current and in the proper direction in the adjacent polar projections of successive pairs of polar projections to bring about a reversal of the current in the armature-sections at the required times in whichever direction the machine be running and whether as a generator or motor as set forth.

2. In a dynamo-electric machine, the combination with an armature and a field-magnet having two or more poles of a corresponding number of pairs of reversing pole-pieces, the pole-pieces of each pair being arranged at opposite sides of the corresponding field-magnet pole, and arranged in proximity to the armature-core so as to be magnetized thereby when a current is flowing through the armature-winding.

3. A dynamo-electric machine having an armature in which the sections of the armature-winding are connected to the commutator-sections by commutator-coils, and a field-magnet each pole of which is provided with an independent pair of reversing pole-pieces arranged at opposite sides of and separate from said field-magnet pole, each pair of pole-pieces being magnetically connected together and arranged in proximity to the armature-core so as to form a magnetic circuit therewith, substantially as described.

4. In a dynamo-electric machine, the combination with an armature the sections of whose winding are connected to the commutator-sections by commutator-coils portions of each of which are located on opposite sides of a section of the said winding to one end of which said commutator-coil is connected, of separate pairs of reversing pole-pieces arranged around the armature and at opposite sides of the field-magnet poles, the pole-pieces of each pair being arranged at opposite sides of the corresponding field-magnet pole, connected magnetically together, and arranged in proximity to the armature-core so as to form therewith a magnetic circuit, substantially as herein described for the purpose specified.

5. In a dynamo-electric machine, the combination with an armature having the sections of its winding connected to commutator-strips by commutator-coils arranged longitudinally upon or within the periphery of the armature and so that portions of the convolutions of each of them will be located on opposite sides of two sections of said winding to the portion of the main armature-winding uniting which said commutator-coil is connected, of pairs of magnetically-connected reversing pole-pieces arranged to be magnetically excited by the armature when a current is flowing through the winding thereof, the adjacent pole-pieces of successive pieces being arranged at a distance apart approximately equal to or a little greater than the distance between the two sides of each of said commutator-coils, substantially as herein described for the purpose specified.

6. In a dynamo-electric machine, the combination with an armature having the sections of its winding connected to commutator-strips by commutator-coils arranged longitudinally upon or within the periphery of the armature and so that portions of the convolutions of each of them will be located on opposite sides of two sections of said winding to the portion of the main armature-winding uniting which said commutator-coil is connected and a field-magnet having two or more poles of pairs of pole-pieces equal in number to the field-magnet poles, the pole-pieces of each pair being arranged longitudinally at each side of the corresponding field-magnet pole, connected together magnetically and arranged in proximity to the armature-core so as to form a magnetic circuit therewith, the distance apart of adjacent pole-pieces of successive pairs of such pole-pieces being approximately equal to or a little greater than the distance apart of the two sides of each of said commutator-coils, substantially as herein described for the purpose specified.

7. In a dynamo-electric machine, the combination with an armature, of reversing pole-pieces arranged to form with the armature-core magnetic circuits through which a magnetic flux is set up when a current is flowing through the armature-winding, and means for varying the resistance of said magnetic circuits and consequently the magnetic flux through such circuits, substantially as described.

8. In a dynamo-electric machine the combination with an armature and field-magnet having two or more poles, of a corresponding number of pairs of reversing pole-pieces, the pole-pieces of each pair being magnetically connected together, arranged at opposite sides of the corresponding field-magnet pole and in proximity to the armature-core so as to form a magnetic circuit therewith, and one or more adjustable magnetic links arranged in each of said magnetic circuits, substantially as herein described for the purpose specified.

9. In a dynamo-electric machine, the combination with an armature having the sections of its winding connected to the commutator-sections by commutator-coils, and a field-magnet having two or more poles, of a corresponding number of pairs of pole-pieces consisting of iron bars arranged longitudinally of the armature with their inner ends near to but out of contact with the armature, each pair of iron bars being connected together and carried by a fixed iron frame extending around or partly around the corresponding field-magnet pole but out of contact therewith, substantially as herein described.

10. In a dynamo-electric machine, the combination with an armature having the sections of its winding connected to the commutator-sections by commutator-coils, and a field-magnet having two or more poles, of a corresponding number of pairs of pole-pieces consisting of iron bars arranged longitudinally of the armature with their inner ends near to but out of contact with the armature each pair of iron bars being connected together and carried by a fixed iron frame extending around or partly around the corresponding field-magnet pole but out of contact therewith, each of said iron frames being made in parts magnetically connected together through one or more adjustable blocks of iron, substantially as herein described for the purpose specified.

In testimony whereof I have signed my name to this specification in the presence of two subscribing witnesses.

WILLIAM BROOKS SAYERS.

Witnesses:
 CHARLES FINLAYSON,
 FRANCIS MONTAGUE COCKBURN.